United States Patent [19]

Liles

[11] Patent Number: 4,800,987
[45] Date of Patent: Jan. 31, 1989

[54] MECHANIC WORKSTAND

[76] Inventor: Kemp C. Liles, 1124 SE. 15th St., Ocala, Fla. 32671

[21] Appl. No.: 165,978

[22] Filed: Mar. 9, 1988

[51] Int. Cl.$^4$ .............................. E06C 5/24; B60R 3/00
[52] U.S. Cl. ........................................ 182/92; 182/150; 182/206
[58] Field of Search ................. 182/150, 92, 206; 280/163, 165, 166

[56] References Cited

U.S. PATENT DOCUMENTS

| | | | |
|---|---|---|---|
| 2,575,503 | 11/1951 | Warren | 182/150 |
| 2,679,436 | 5/1954 | Viebrock | 182/150 |
| 2,848,150 | 8/1958 | Tans | 182/150 |
| 2,878,078 | 3/1959 | Moultrop | 182/150 |
| 2,957,541 | 10/1960 | Everest | 182/115 |
| 2,973,052 | 2/1961 | Miller | 182/150 |
| 3,078,952 | 2/1963 | Kelling | 182/150 |
| 3,590,950 | 5/1970 | Wilson | 182/150 |
| 4,089,276 | 5/1978 | Enos | 182/92 |
| 4,493,393 | 1/1985 | Serber | 182/129 |

*Primary Examiner*—Reinaldo P. Machado

[57] ABSTRACT

A mechanic's work platform for attachment to a front tire of a motor vehicle has an essentially rectangular support frame to be disposed and supported by a front tire of the vehicle. A depending framework is hingedly attached to the support frame and includes a horizontal frame covered with expanded metal or the like to provide a raised platform for the mechanic.

8 Claims, 1 Drawing Sheet

MECHANIC WORKSTAND

BACKGROUND OF THE INVENTION

1. Field of the Invention

The present invention relates to mechanic's workstands for automobiles and trucks, and more particularly to a portable, lightweight mechanic's workstand which will permit reaching into the engine compartment of an automobile without strain.

2. Description of the Prior Art

Modern motor vehicles have high front fenders which makes access from the ground into the engine compartment difficult. Auto mechanics therefore have to work with awkward working positions which results in discomfort and strain. They often use boxes and other makeshift platforms which may be unsafe. Attempts have been made in the prior art to provide work platforms to solve this problem. However, most such attempts have resulted in bulky devices which are difficult to attach and are not totally effective. In Everest et al, U.S. Pat. No. 2,957,541 a stand is described having pipes supporting a platform which requires the attachment by bolts to the engine compartment and is therefore not universally adaptable. Enos, in U.S. Pat. No. 4,089,276, teaches a portable platform that can be attached to the front bumper of an automobile. However, this platform does not provide access to the rear of the engine. In U.S. Pat. No. 4,493,393 to Serber, a mechanic's rest is disclosed which is attached over the engine compartment of an automobile to permit the mechanic to lean his chest thereon. However, this devices does not raise the mechanic's feet from the floor.

There is a need for a simple, low cost lightweight platform that can be quickly attached to an automobile which will raise the mechanic from the ground a sufficient distance to permit him to reach all portions of the engine in the engine compartment of a modern motor vehicle.

SUMMARY OF THE INVENTION

The present invention is a work platform for mechanics which provides access to the engine compartment of an automobile or truck from the side. A framework is provided having an upright portion and a horizontal platform extending from the lower end thereof forming an L-shape. The platform portion may be covered with expanded metal or other material. The upper portion of the vertical frame has an essentially rectangular frame pivotally attached along an upper horizontal portion thereof. To use the platform, the mechanic places the pivoted rectangular frame over the top of a front tire of an automobile. The L-shaped frame then depends from the pivoted rectangular frame and the vertical portion of the frame will bear against the outside surfaces of the tire. The mechanic may then stand on the platform portion and be able to reach into all parts of the engine compartment adjacent the front wheel. The workstand may be moved to the opposite wheel when access to the other side of the compartment is needed. By virtue of the pivoted frame, the mechanic may lean over the engine while maintaining his feet on the platform which will then swing upward slightly. Thus, the danger of the mechanic's feet slipping from the platform in such instances is eliminated. When the stand is not in use, the hinged frame can be folded toward the platform for ease of storage.

It is therefore a principal object of the invention to provide a workstand for a mechanic which will provide access to the engine compartment of a motor vehicle without undue strain to the mechanic.

It is another object of the invention to provide a workstand which can be quickly and easily attached to the front tire of an automobile to provide a safe work platform to a mechanic.

It is another object of the invention to provide a work platform in which the platform will pivot outward from the unattaching portion such that the mechanic can keep his feet on the platform even when bending over an engine compartment.

It is still another object of the invention to provide a lightweight low cost mechanic work platform which will fold into a compact unit for storage or transportation.

These and other objects and advantages of the invention will become apparent from the following detailed description when read in conjunction with the drawings.

DETAILED DESCRIPTION OF THE PREFERRED EMBODIMENT

Figure 1:
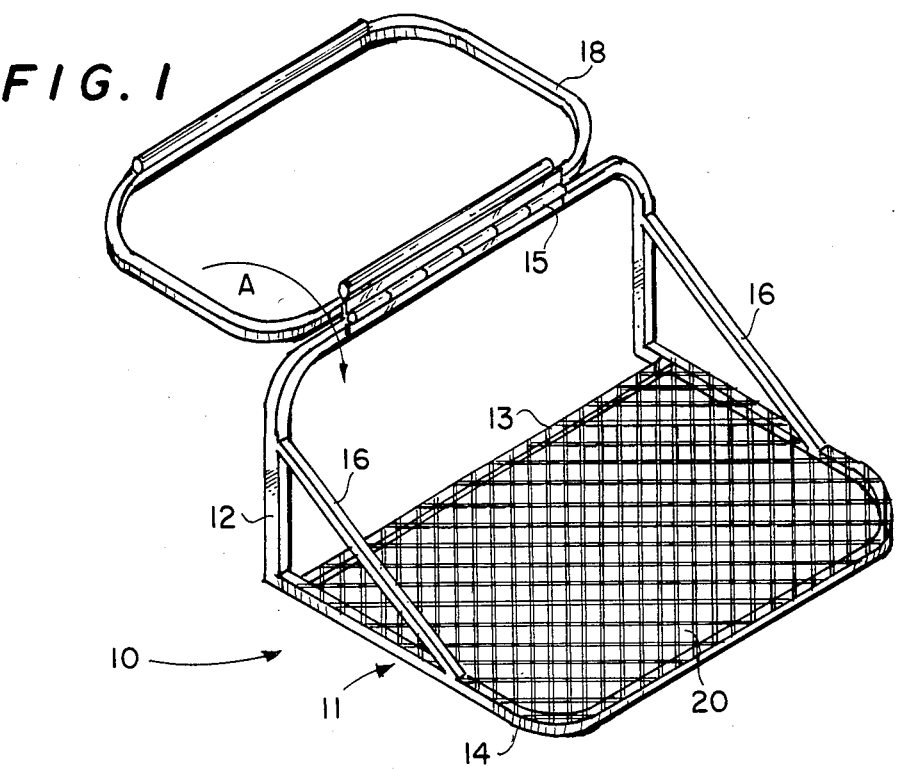
FIG. 1 shows a perspective view of a platform in accordance with the invention in position for placing on a tire.

Referring first to FIG. 1, the work platform 10 of the invention includes a framework having a vertical frame portion 12 and a platform 11 including a horizontal frame portion 14 with a horizontal cross member 13, and platform covering 20. Framework portions 12, 13 and 14 may be formed from any suitable material such as angle iron, square, or cylindrical steel tubing, aluminum tubing, or the like. Horizontal frame portions 14 and 13 form an essentially rectangular frame preferably with rounded corners to minimize sharp projections for safety. The horizontal frame 14 is covered with a platform material 20 which may be expanded metal, heavy steel mesh, or sheet metal. Where sheet metal is used, it is preferably ribbed for strength. Horizontal platform 1 is further attached to vertical frame portion 12 by braces 16.

An essentially rectangular support frame 18 is attached to the horizontal member of vertical frame 12 by a piano hinge 15. Hinge 15 serves the purpose of permitting support frame 18 to swing in a direction shown by arrow A to facilitate storage and transport of the platform 10. In FIG. 1, support frame 18 is in position for attaching to a tire and wheel.

Figure 2:
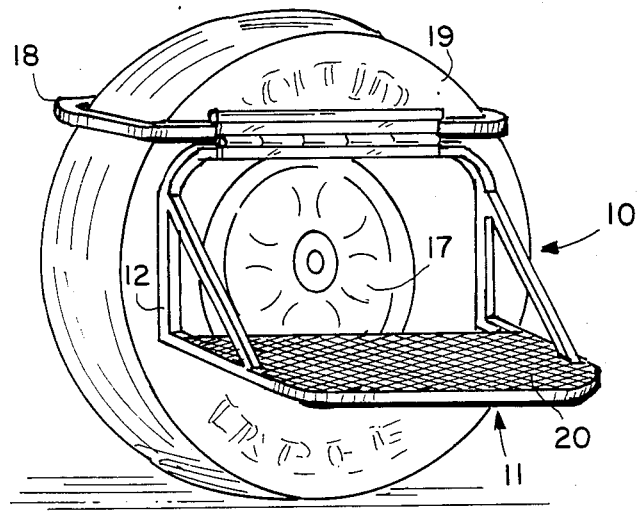
FIG. 2 is a perspective view of a front wheel and tire with the work platform of the invention installed thereon.

Turning now to FIG. 2, the method of attaching the platform 10 to a vehicle is indicated. A front wheel 17 and tire 19 is shown with support frame 18 disposed over the top of tire 19. As will be recognized, the long dimension of support frame 18 is such that, for the most common motor vehicle tire sizes, the workstand 10 will be suspended as shown. Where trucks and vehicles with large wheels are to be worked on, larger support frames 18 may be utilized. Hinge 15 may have a removable pin 22 such that various size frames 18 may be used. When the workstand is installed, as shown in FIG. 2, it will be noted that the platform portion 11 will swing downward and vertical frame 12 will bear against the outer sidewalls of tire 19. Thus, the mechanic may stand on platform 11 with his weight assisting in holding the platform securely in place.

Figure 3:
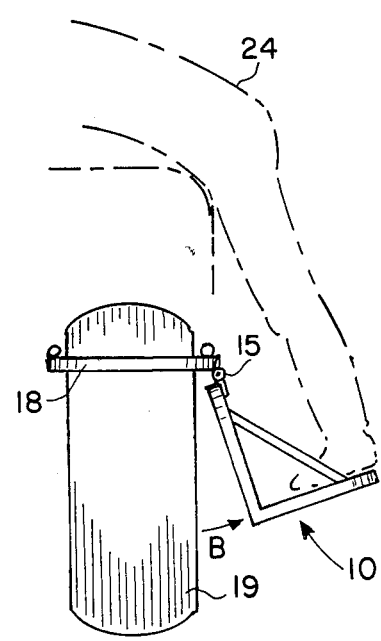
FIG. 3 is a front view of a front wheel and tire having the work of the invention installed thereon and a mechanic in phantom view showing how the work platform will swing outward when required.

As is well known, many mechanics utilize empty boxes and other makeshift platforms to reach into the engine compartments of motor vehicles. At times, it is necessary to reach down deeply into the compartment and the mechanic's feet may leave his makeshift platform which creates a dangerous condition. As shown in FIG. 3, the workstand of the invention permits the mechanic 24 to lean forward into the engine compartment while maintaining his feet on the workstand 10 which can swing outward as indicated by arrow B. Thus, when the mechanic straightens up, the work platform 11 will return to its normal position with no danger of of the mechanic slipping from the workstand.

As will now be recognized, a simple, low cost and easy to use mechanics workstand has been described with reference to the preferred embodiment. However, variations in the construction and materials used in the workstand may be made without departing from the spirit and scope of the invention.

I claim:

1. A mechanic's work platform for a motor vehicle comprising:
    a framework having a vertical frame portion and a horizontal frame portion at the lower edge of said vertical frame portion;
    a platform covering disposed over said horizontal frame portion;
    an essentially rectangular support frame hingedly attached to an upper edge of said vertical frame portion; and
    said support frame adapted to be disposed over a vehicle tire with said vertical frame portion then depending therefrom and in contact with said tire.

2. The platform as recited in claim 1 in which said framework includes braces between said vertical frame portion and said horizontal frame portion.

3. The platform as recited in claim 1 in which said platform covering is expanded metal mesh.

4. The platform as recited in claim 1 in which said framework and said support frame are formed of steel.

5. The platform as recited in claim 1 in which said framework and said support frame are formed of aluminum.

6. A mechanic's work platform to provide access to the engine compartment of a motor vehicle comprising:
    an essentially rectangular support frame having dimensions to be disposed over and supported by a front tire and wheel of said vehicle;
    a hinge attached along an outer edge of said support frame when disposed over said tire;
    a framework having an essentially vertical rectangular frame with an upper portion thereof attached to said hinge to permit said framework to pivot with respect to said support frame, and an essentially horizontal rectangular frame attached along a lower portion of said vertical frame, said vertical frame depending from said support frame and normally in contact with said tire; and
    a platform covering disposed over said horizontal frame.

7. The platform as recited in claim 6 in which said hinge includes a removable hinge pin for attaching differing size support frames to said framework.

8. The platform as defined in claim 7 which further comprises a plurality of differing size support frames, each having a hinge part for attachment to said framework.

* * * * *